United States Patent Office 3,479,400
Patented Nov. 18, 1969

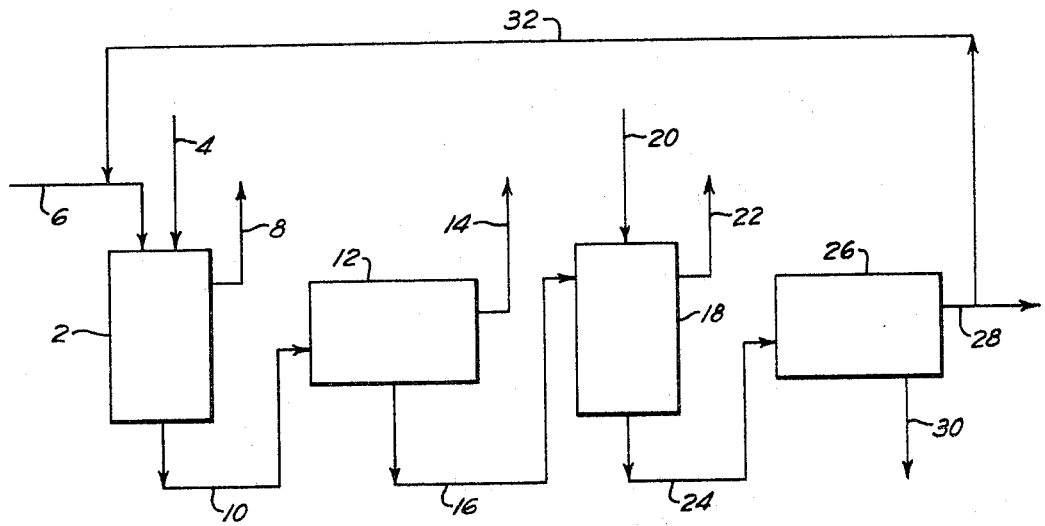
INVENTORS.
HENRI K. LESE
JOHANN G. D. SCHULZ
ARTHUR C. WHITAKER

3,479,400
OXIDATION OF 1,1-DIARYLALKANES
Henri K. Lese, McKeesport, and Johann G. D. Schulz and Arthur C. Whitaker, Pittsburgh, Pa., assignors to Gulf Research & Development Company, Pittsburgh, Pa., a corporation of Delaware
Filed Nov. 24, 1964, Ser. No. 413,490
Int. Cl. C07c 65/20
U.S. Cl. 260—517    7 Claims

ABSTRACT OF THE DISCLOSURE

A process for converting a 1,1-diarylalkane to the corresponding diarylketone which involves oxidizing the 1,1-diarylalkane in a first reaction zone with nitric acid, reacting the solid product obtained in the first reaction zone with nitric acid in a second reaction zone under conditions more sever than those in the first reaction zone to obtain the desired diarylketone and thereafter, in a preferred embodiment, recycling an aqueous solution containing nitric acid to the first reaction zone.

---

This invention relates to a process for preparing diarylketones, preferably diarylketone polycarboxylic acids.

The process of this invention is carried out by oxidizing a 1,1-diarylalkane, such as a 1,1-di(alkylphenyl)alkane, with an aqueous solution containing a selected amount of nitric acid to obtain a reaction mixture containing solids and an aqueous phase, separating said solids from said aqueous phase, further subjecting said solids to oxidation with nitric acid to obtain a reaction mixture containing the desired diarylketone, preferably the desired diarylketone carboxylic acid, and an aqueous phase containing nitric acid and thereafter separating said diarylketone from said latter aqueous phase. In a preferred embodiment, the latter aqueous phase is employed in the initial oxidation as said aqueous solution for oxidizing the 1,1-diarylalkane charge.

The process of this invention can further be illustrated by reference to the accompanying drawing which illustrates a preferred embodiment thereof.

Referring to the drawing, there is introduced into reactor 2 by line 4 a 1,1-diarylalkane, such as a 1,1-di-(alkylphenyl)ethane, particularly a 1,1-di(methylphenyl)-ethane, represented in general by the following structural formula:

wherein R and $R_1$, the same or different, are aryl radicals containing one or more rings, at least one of which is an aromatic ring, such as phenyl, biphenyl, naphthyl, phenanthryl, anthryl, indyl, dihydronaphthyl, cyclohexylphenyl, etc., said aryl radicals preferably carrying as nuclear substituents 0 to 5 radicals defined by $R_2$; and $R_2$ is selected from the group consisting of primary, secondary and tertiary alkyls having from one to 16 carbon atoms, preferably from one to eight carbon atoms, such as methyl, ethyl, n-propyl, isopropyl, isobutyl, amyl, isoamyl, hexy, isooctyl, decyl, tetradecyl, hexadecyl, etc., as well as groups such as F, Cl, Br, I, $NO_2SO_3H$, COOH, COOR (where R is an alkyl group), $NH_2$, OH, etc. Specific examples of compounds which can be employed are 1,1-diphenylethane, 1,1-bis(4 - methylphenyl)ethane, 1,1-bis-(3,4 - dimethylphenyl)ethane, 1,1-bis(2 - ethylphenyl)-ethane, 1-(4-propylphenyl), 1 - (4-propylphenyl)pentane, 1,1-bis(2-methylanthryl)butane, 1 - (2 - methyl,4-chlorophenyl), 1 - (2-ethylphenyl)octane, 1,1-bis(2,3,4,5-tetramethylphenyl)decane, 1 - (2 - methyl,4-isopropylphenyl), 1-4-methyl-2-nitrophenyl)ethane, 1,1-bis(2,4 - diisopropylphenyl)hexadecane, 1,1-bis(2 - ethyl,4 - butylphenyl)isobutane, 1,1-bis((2-hexylphenanthryl), 3,3 - dimethylpentane, 1-(2-propyl,3-carboxynaphthyl), 1 - (4-butylphenyl)-hexane, 1 - (5-octyl,1,4-dihydronaphthyl), 1-(2-methylnaphthyl)dodecane, 1 - (bromo - 9,10 - dihydrophenanthryl), 1 - (2-ethylphenyl)decane, 1 - (2-propyl,3 - aminophenyl), 1 - (4 - methyl - 2 - sulfophenyl)ethane, etc. Of these, we prefer to employ 1,1-bis(4-methylphenyl)-ethane and 1,1-bis(3,4-dimethylphenyl)ethane.

There is also introduced into reactor 2, but by line 6, an aqueous solution containing from about one to about 70 percent by weight, preferably from about to about 40 percent by weight of nitric acid, calculated as 100 percent nitric acid, based on the aqueous solution. On a weight basis the amount of said aqueous solution employed relative to the 1,1-diarylalkane can vary over a wide ratio, for example, from about 100:1 to about 1:100, but preferably will be from about 10:1 to about 1:10. The temperature within reactor 2 can be within a range of about 80° to about 300° C., but preferably will be from about 100° to about 200° C. Pressure is not critical but can be, for example, above about 0 pound per square inch gauge, but preferably is within the range of about 0 to about 1000 pounds per square inch gauge. The residence time can also vary over a wide range and can be, for example, from about one minute to about 48 hours, but preferably will be from about 15 minutes to about eight hours.

As a result of the conditions thus prevailing in reactor 2, it is believed that primarily water-insoluble precursors of the desired diarylketones, such as diarylketone carboxylic acids, are formed by oxidation of the 1,1-diarylalkanes with the nitric acid. The nitric acid is thereby decomposed and the nitrogen oxides that are formed can be removed from reactor 2 by line 8.

The reaction mixture obtained at the end of the reaction period is removed from reactor 2 by line 10 and passed to a separator 12. The reaction mixture comprises an aqueous phase and an organic phase, which can be solid, semisolid or liquid. Since the amount of nitric acid present in reactor 2 is a selected amount, the amount of nitric acid present in the aqueous phase at the end of the reaction period therein under the most desirable operating conditions is practically negligible. This is so because the amount of the nitric acid introduced by line 6 is so selected and the reaction conditions in reactor 2 are so controlled that at the end of the reaction period the defined desired precursors have been obtained and the nitric acid introduced into reactor 2 has been substantially consumed. In any event, the amount of nitric acid in the aqueous phase passing through line 10 is substantially below the amount in the aqueous solution passing through line 6. Thus, at least about 50 to about 75, and preferably at least about 80 to about 100 percent by weight of the nitric acid introduced into reactor 2 is consumed therein. The amount of nitric acid in the aqueous phase will thus be about 0 to about 35 percent by weight thereof, preferably about 0 to about 6 percent by weight thereof. The aqueous phase also contains from about one to about 99 percent, preferably from about one to about 50 percent, by weight of dissolved organic compounds.

In separators 12, wherein the temperature can be, for example, from about 0 to about 300° C., and the pressure can be, for example, from about 0 to about 1000 pounds per square inch gauge, the aqueous phase obtained in reactor 2 can be separated from the solids obtained therein in any convenient manner, for example, by mechanical separation. Thus, while decantation is preferred, centrifugation or filtration can also be employed if desired. The aqueous phase, containing preferably very little or no nitric acid, is removed from separator 12 by line 14.

There is removed from separator 12 by line 16 the organic phase obtained in reactor 2, which is believed to contain the precursors of the desired diarylketone product. These precursors are believed to be nitro derivatives of the 1,1-diarylketone charge, ketonic derivatives, mono, and in some cases, polycarboxylic derivatives thereof, etc. This mixture is introduced into oxidation reactor 18. Also introduced therein, but by line 20, is an aqueous solution containing from about five to about 100 percent by weight, preferably from about 55 to about 70 percent by weight of nitric acid, calculated as 100 percent nitric acid, based on said aqueous solution. On a weight basis, the amount of said aqueous solution introduced into oxidation reactor 18 relative to the solids introduced therein is large and must be from about 3:1 to about 100:1, preferably from about 6:1 to about 10:1. The temperature in oxidation reactor 18 must be in the range of about 110° to about 350° C., preferably in the range of about 120° to about 220° C. Pressure can be at least about five, preferably will be from about 100 to about 1000 pounds per square inch gauge. The residence time in reactor 18 must be at least about 10 minutes, but preferably is in the range of about 0.5 to about 8 hours. During the oxidation, some of the nitric acid is consumed and the nitrogen oxides formed are removed from oxidation reactor 18 by line 22.

The reaction conditions existing in oxidation reactor 18 are far more severe than those existing in reactor 2 and the amount of nitric acid present is such that there is a large excess in oxidation reactor 18 at all times. As a result of these conditions, desired diarylketones are obtained. Thus, the alkane portion on the 1,1-diarylalkane charge has been converted to a bridge carbonyl and substituents on the ring on the 1,1-diarylalkane charge, for example, an alkyl substituent, has been converted to a carboxyl function. At the same time, since the reaction conditions in oxidation reactor 18 have been somewhat severe, some monocyclic aromatic compounds are also obtained along with complex nitrogen-containing compounds. The former desired compounds are insoluble in the aqueous phase, whereas the latter by-products are soluble in the aqueous phase. Since only about 30 to about 95 percent, preferably about 75 to about 95 percent, by weight of the nitric acid introduced into oxidation reactor 18 is consumed therein, the remainder thereof is also contained in the aqueous phase. The amount of nitric acid in the latter aqueous phase will thus be about one to about 70 percent by weight, preferably about one to about 40 percent by weight.

The aqueous phase along with the desired solid, particulate diarylketone product is removed from oxidation reactor 18 by line 24 and pased to separator 26 wherein a temperature, for example, of about 0° to about 50° C., and a pressure, for example, of about 0 to about 10 pounds per square inch gauge can be maintained. Here separation of solids from the aqueous phase can be effected in any suitable manner, for example, in a manner similar to that employed in separator 12. The aqueous phase containing nitric acid and the soluble by-products defined above are removed from separator 26 by line 28, while the desired diarylketone solid product is removed from separator 26 by line 30. If desired, the desired diarylketones in line 30 can be washed with a solvent, such as water, to remove soluble impurities still associated therewith.

Since the severe oxidation conditions prevailing in oxidation reactor 18 require a large amount of nitric acid therein, the amount of nitric acid present in the aqueous solution in line 28 is quite large. The recovery of such nitric acid is extremely difficult. To subject such aqueous solution to evaporation conditions is not a feasible solution. Evaporation procedures are expensive. Moreover, when the amount of nitric acid in the solution becomes about 68 percent a constant boiling aqueous-nitric acid solution distills over. In addition, as the solution becomes more concentrated, the organic compounds in the aqueous solution, which may be valuable, may be decomposed or otherwise adversely affected by the nitric acid.

We have found, in a preferred embodiment, that the aqueous solution issuing from line 28 can contain nitric acid in an amount thereof corresponding to the amount of nitric acid that can be in the aqueous solution introduced into the system by line 6 and can, therefore, in whole or in parts, be recycled thereto by line 32. However, in order to obtain a particularly desirable concentration of nitric acid in the aqueous phase issuing from line 28 so that the same can be employed in reactor 2, it is within the scope of the process defined herein to remove or add water to the solution issuing from line 28 as desired. When all or any part of the solution is recycled to reactor 2 to constitute the oxidizing medium therein, the oxidation conditions previously defined in reactor 2, as well as the other reaction conditions defined subsequent thereto can still be employed.

The preferred embodiment defined above is particularly attractive and effective. This expedient solves the problem of recovering the large amount of nitric acid present in line 28 for reuse in the instant process or for some other purpose. Utilization of nitric acid in the process is greatly increased, particularly in view of the fact that the product issuing from line 10 contains little or no appreciable amounts of nitric acid. The soluble compounds defined above derived from the oxidation of the 1,1-diarylalkanes herein and which are present in the aqueous solution in line 28 recycled to reactor 2 includes the following: trimellitic acid, highly water soluble aromatic mono- or polycarboxylic acids and keto mono- or polycarboxylic acids, some or all of which contain nitrogen. These compounds are valuable and can be employed as intermediates in the preparation of plasticizers, plastics and as curing agents for epoxy resins. Fortuitously, these soluble organic compounds are unaffected by the relatively mild oxidation conditions prevailing in reactor 2. Moreover, these soluble compounds find themselves in the aqueous solution removed from the system by line 14 and are easily recovered. In a preferred embodiment wherein the nitric acid in reactor 2 is substantially consumed therein, there will be little or no nitric acid in line 14. In such case, recovery of the desired organic compunds in line 14 can be easily effected, for example, by evaporation at a temperature of about 0° to about 150° C. and a pressure of about 0 to about 70 pounds per square inch absolute. In the event there is a residual amount of nitric acid in line 14, the desired organic compounds dissolved in the aqueous phase can be recovered by extracting the same, for example, with solvents, such as methyl ethyl ketone, methyl isobutyl ketone, diethyl ketone, chloroform at temperatures ranging from about 0° to about 200° C. An organic and an aqueous phase is thus obtained. The former contains the soluble organic compounds extracted from the aqueous phase and can be separated by decantation. In this preferred procedure, substantially complete utilization of nitric acid and recovery of the desired diarylketones and water-soluble organic compounds is obtained.

It is understood that aqueous solutions of nitric acid are employed herein for the oxidation reactions in reactors 2 and 18. The nitric acid can be introduced into the system as such or nitrogen oxides, such as NO, $NO_2$, $N_2O_4$, $N_2O_5$ or $NO_3$, and water can be added to the system to form nitric acid in situ. Each procedure will operate successfully within the scope of the process defined herein and wherein "nitric acid" is used herein, it is understood to encompass the use of the defined nitrogen oxides and water.

Specific examples of diarylketones that can be prepared in accordance with the procss defined herein are benzophenone, benzophenone 4-carboxylic acid, benzophenone 4,4'-dicarboxylic acid, benzophenone 2,4,6-tricarboxylic acid, benzophenone 2,4,2',4'-tetracarboxylic acid, benzophenone 3,4,3',4'-tetracarboxylic acid, benzophenone decacarboxylic acid, 2-chlorobenzophenone 4'-carboxylic acid, 3,3'-dinitrobenzophenone, 4-sulfobenzophenone, dinaphthylketone, phenyl - naphthylketone, tolyl - anthrylketone, 2 - methyl, 4' - carboxybenzophenone, 2 - chloro-4-methylbenzophenone 4'-carboxylic acid, etc.

The process of this invention can further be illustrated by the following examples:

EXAMPLE I

Into a one-gallon stainless steel stirred autoclave there were charged 448 grams of 1,1 - bis(3,4-dimethylphenyl)ethane, 301 grams of water and 2401 grams of an aqueous filtrate from a previous run containing 23.9 percent by weight of nitric acid and 7.0 percent by weight of soluble organic acids. This mixture was reacted at 220° F. and 200 pounds per square inch gauge for 2.5 hours, after which evolution of nitrogen oxides ceased. On cooling to room temperature, the product separated into a lower organic phase and an upper aqueous phase. The aqueous phase was decanted and found to contain 9.9 percent by weight of nitric acid and 7.2 percent by weight of soluble organic acids. Evaporation at 65° and a pressure of 190 millimeters of mercury gave 105.4 grams of solids. The organic phase, which was solid at room temperature, was further oxidized with a mixture of 1578 grams of 70 percent by weight of nitric acid and 821 grams of water for four hours at 350° F. and 200 pounds per square inch gauge. The product from this oxidation was recovered by filtration and was found to consist of 400 grams of solid white benzophenone 3,4,3', 4' - tetracarboxylic acid, corresponding to a molar efficiency of 59.4 percent. The aqueous filtrate contained 14.3 percent by weight of nitric acid and 11.6 percent by weight of soluble organic acids.

EXAMPLE II

Into a one-gallon stainless steel stirred autoclave there were charged 449 grams of 1,1 - bis(3,4 - dimethylphenyl)ethane and 1744 grams of the aqueous filtrate from Example I containing 14.3 percent by weight of nitric acid and 11.6 percent by weight of soluble organic acids. This mixture was reacted at 220° F. and 200 pounds per square inch gauge for 2.5 hours, after which evolution of nitrogen oxides ceased. The product was solid at room temperature and separated into a lower organic phase and an upper aqueous phase. The aqueous phase was decanted and found to contain 3.47 percent by weight of nitric acid and 12.5 percent by weight of soluble organic acids. Evaporation at 65° C. and a pressure of 190 millimeters of mercury gave 144.2 grams of solids. The organic phase, which was a solid at room temperature, was further oxidized with a mixture of 2100 grams of 70 percent by weight of nitric acid and 820 grams of water for four hours at 350° F. and 200 pounds per square inch gauge. The product from this oxidation was recovered by filtration and was found to consist of 414 grams of solid white benzophenone 3,4,3',4' - tetracarboxylic acid, corresponding to a 62.4 percent molar efficiency. The aqueous filtrate contained 20.4 percent by weight of nitric acid and 9.6 percent by weight of soluble organic acids.

EXAMPLE III

Into a one-gallon stainless steel stirred autoclave there were charged 447 grams of 1,1 - bis(3,4 - dimethylphenyl)ethane, 200 grams of water and 2106 grams of an aqueous filtrate from a previous run containing 21.4 percent by weight of nitric acid and 7 percent by weight of soluble organic acids. This mixture was reacted at 320° F. and 200 pounds per square inch gauge for two hours, after which evolution of nitrogen oxides ceased. On cooling to room temperature, the product separated into a lower organic phase and an upper aqueous phase. The aqueous phase was decanted and found to contain 10.1 percent by weight of soluble organic acids but no nitric acid. Evaporation at 65° C. and a pressure of 190 millimeters of mercury gave 146.2 grams of solids. The organic phase, which was solid at room temperature, was further oxidized with a mixture of 1764 grams of 70 percent by weight of nitric acid and 821 grams of water for four hours at 350° F. and 200 pounds per square inch gauge. The product from this oxidation was recovered by filtration and was found to consist of 400 grams of solid white benzophenone 3,4,3',4' - tetracarboxylic acid, corresponding to a molar efficiency of 60 percent. The aqueous filtrate contained 21.6 percent by weight of nitric acid and ten percent by weight of soluble organic acids.

EXAMPLE IV

Into a one-gallon stainless steel stirred autoclave there were charged 506 grams of 1,1 - bis(4 - methylphenyl) ethane, 602 grams of water and 1537 grams of an aqueous filtrate from a previous run containing 20.2 percent by weight of nitric acid and 0.7 percent by weight of soluble organic acids. This mixture was reacted at 320° F. and 200 pounds per square inch gauge for two hours, after which evolution of nitrogen oxides ceased. On cooling to room temperature, the product separated into a lower organic phase and an upper aqueous phase. The aqueous phase was decanted and found to contain 0.5 percent by weight of soluble organic acids with no nitric acid. Evaporation at 65° C. and a pressure of 190 millimeters of mercury gave 8.3 grams of solids. The organic phase, which was solid at room temperature, was further oxidized with a mixture of 1512 grams of 70 percent by weight of nitric acid and 1046 grams of water for four hours at 350° F. and 200 pounds per square inch gauge. The product from this oxidation was recoverd by filtration and was found to consist of 547 grams of solid white benzophenone 4,4' - dicarboxylic acid, corresponding to an 84.2 percent molar efficiency. The aqueous filtrate contained 20.9 percent by weight of nitric acid and 0.8 percent by weight of soluble organic acids.

EXAMPLE V

Into a one-gallon stainless steel stirred autoclave there were charged 507 grams of 1,1 - bis(4 - methylphenyl) ethane and 1342 grams of an aqueous filtrate from a previous run containing 19.6 percent by weight of nitric acid and 0.6 percent by weight of soluble organic acids. This mixture was reacted at 320° F. and 200 pounds per square inch gauge for two hours, after which evolution of nitrogen oxides ceased. On cooling to room temperature, the product separated into a lower organic phase and an upper aqueous phase. The aqueous phase was decanted and found to contain 0.7 percent by weight of soluble organic acids with no nitric acid. Evaporation at 65° C. and a pressure of 190 millimeters of mercury gave 7.4 grams of solid acids. The organic phase, which was a solid at room temperature, was further oxidized with a mixture of 1470 grams of 70 percent by weight of nitric acid and 1050 grams of water for four hours at 350° F. and 200 pounds per square inch gauge. The product from this oxidation was recovered by filtration and was found to consist of 534 grams of solid white benzophenone 4,4' - dicarboxylic acid, corresponding to a molar efficiency of 82 percent. The aqueous filtrate contained 18.6 percent by weight of nitric acid and 0.7 percent by weight of soluble organic acids.

Obviously many modifications and variations of the invention, as hereinabove set forth, can be made without departing from the spirit and scope thereof, and therefore only such limitations should be imposed as are indicated in the appended claims.

We claim:

1. A process for converting a 1,1-diarylalkane selected from the group consisting of 1,1-bis-(4-methylphenyl) ethane and 1,1-bis(3,4-dimethylphenyl)ethane to the corresponding diarylketone carboxylic acid which comprises oxidizing said 1,1-diarylalkane in first reaction zone wherein the temperature is within the range of about 80° to about 300° C., the pressure above about 0 pound per square inch gauge, and the residence time is from about one minute to about 48 hours with an aqueous solution containing from about 1 to about 70 percent by weight of nitric acid to obtain a first reaction mixture containing solids, said solids being water-insoluble precursors of said diarylketone carboxylic acid, and a first aqueous phase and wherein said nitric acid is substantially consumed during oxidation, separating said solids from said aqueous phase, subjecting said solids to oxidation with nitric acid in a second reaction zone wherein the temperature is within the range of about 110° to about 350° C., the pressure above about 5 pounds per square inch gauge, and the residence time is at least about 10 minutes with an aqueous solution containing from about 5 to about 100 percent by weight of nitric acid, the oxidation conditions in said second reaction zone being more severe than the oxidation conditions prevailing in said first reaction zone, to obtain a second reaction mixture containing the desired diarylketone carboxylic acid as a solid and an aqueous phase containing nitric acid having a nitric acid concentration lower than that existing in said second reaction zone, separating said solid diarylketone from the aqueous phase and thereafter recycling said latter aqueous phase containing nitric acid to said first reaction zone.

2. The process of claim 1 wherein said diarylalkane is 1,1-bis(4-methylphenyl)ethane.

3. The process of claim 1 wherein said diarylalkane is 1,1-bis(3,4-dimethylphenyl)ethane.

4. The process of claim 1 wherein said diarylalkane is 1,1-bis(4-methylphenyl)ethane, the aqueous solution employed in the first stage contains from about one to about forty percent by weight of nitric acid, the temperature is within the range of about 100° to about 200° C., the pressure about 0 to about 1000 pounds per square inch gauge, the residence time is from about fifteen minutes to about eight hours, the aqueous solution employed in the second reaction zone contains from about 55 to about 70 percent by weight of nitric acid, the temperature is within the range of about 120° to about 220° C., the pressure about 100 to about 1000 pounds per square inch gauge and the residence time is from about 0.5 to about 8 hours.

5. The process of claim 1 wherein said diarylalkane is 1,1-bis(3,4-dimethylphenyl)ethane, the aqueous solution employed in the first stage contains from about one to about forty percent by weight of nitric acid, the temperature is within the range of about 100° to about 200° C., the pressure about 0 to about 1000 pounds per square inch gauge, the residence time is from about fifteen minutes to about eight hours, the aqueous solution employed in the second reaction zone contains from about 55 to about 70 percent by weight of nitric acid, the temperature is within the range of about 120° to about 220° C., the pressure about 100 to about 1000 pounds per square inch gauge and the residence time is from about 0.5 to about 8 hours.

6. The process of claim 1 wherein said diarylalkane is 1,1-bis(4-methylphenyl)ethane, the aqueous solution employed in the first stage contains from about one to about forty percent by weight of nitric acid, the temperature is within the range of about 100° to about 200° C., the pressure about 0 to about 1000 pounds per square inch gauge, the residence time is from about fifteen minutes to about eight hours, the aqueous solution employed in the second reaction zone contains from about 55 to about 70 percent by weight of nitric acid, the temperature is within the range of about 120° to about 220° C., the pressure about 100 to about 1000 pounds per square inch gauge, the residence time is at least about ten minutes and said latter aqueous phase containing nitric acid is recycled to the first stage of the process as oxidant therein.

7. The process of claim 1 wherein said diarylalkane is 1,1-bis(3,4-dimethylphenyl)ethane, the aqueous solution employed in the first stage contains from about one to about forty percent by weight of nitric acid, the temperature is within the range of about 100° to about 200° C., the pressure about 0 to about 1000 pounds per square inch gauge, the residence time is from about fifteen minutes to about eight hours, the aqueous solution employed in the second reaction zone contains from about 55 to about 70 percent by weight of nitric acid, the temperature is within the range of about 120° to about 220° C., the pressure is about 100 to about 1000 pounds per square inch gauge, the residence time is at least about ten minutes and said latter aqueous phase containing nitric acid is recycled to the first stage of the process as oxidant therein.

References Cited
UNITED STATES PATENTS 3,075,007  1/1963  McCracken et al. ____ 260—517

FOREIGN PATENTS 713,812  8/1954  Great Britain.

LORRAINE A. WEINBERGER, Primary Examiner

M. G. BERGER, Assistant Examiner

U.S. Cl. X.R.

260—524, 591